United States Patent
Zhan et al.

(10) Patent No.: US 8,339,055 B2
(45) Date of Patent: Dec. 25, 2012

(54) INRUSH CURRENT LIMITER FOR AN LED DRIVER

(75) Inventors: Xiaodong Zhan, Plano, TX (US); Fred F. Greenfeld, Nederland, CO (US); Xiangxu Yu, Shenzhen (CN)

(73) Assignee: Intersil Americas Inc., Milpitas, CA (US)

( * ) Notice: Subject to any disclaimer, the term of this patent is extended or adjusted under 35 U.S.C. 154(b) by 373 days.

(21) Appl. No.: 12/822,290

(22) Filed: Jun. 24, 2010

(65) Prior Publication Data
US 2011/0025217 A1 Feb. 3, 2011

Related U.S. Application Data

(60) Provisional application No. 61/230,989, filed on Aug. 3, 2009.

(51) Int. Cl.
*H05B 37/00* (2006.01)
(52) U.S. Cl. ............... 315/219; 315/276; 315/307
(58) Field of Classification Search .......... 315/294, 315/291, 307, 308, 276, 277, 278, 279, 219
See application file for complete search history.

(56) References Cited

U.S. PATENT DOCUMENTS

| | | | | |
|---|---|---|---|---|
| 4,370,601 A | * | 1/1983 | Horii et al. | 315/307 |
| 2008/0136350 A1 | * | 6/2008 | Tripathi et al. | 315/294 |
| 2009/0021185 A1 | * | 1/2009 | Ng | 315/294 |

* cited by examiner

*Primary Examiner* — David H Vu
(74) *Attorney, Agent, or Firm* — Gary Stanford

(57) ABSTRACT

An inrush current limiter for use with an LED driver including a current limiting device, a bypass switch device, and a switch drive. The current limiting device is placed in the input current path of the LED driver to limit input current to a predetermined maximum level in response to an AC conductive angle modulated voltage. The bypass switch device is coupled in parallel with the current limit device. The switch drive turns on the bypass switch device to at least partially bypass the current limiting device as a voltage level of an input of a switching converter rises. The input current remains sufficiently high without exceeding the maximum level. The switch drive is implemented with a delay network driven either by a separate transformer winding or by a snubber network. The delay network may have a delay based on the delay caused by the current limiting device.

21 Claims, 7 Drawing Sheets

INRUSH CURRENT LIMITER FOR AN LED DRIVER

CROSS-REFERENCE TO RELATED APPLICATIONS

This application claims the benefit of U.S. Provisional Application Ser. No. 61/230,989, filed on Aug. 3, 2009, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
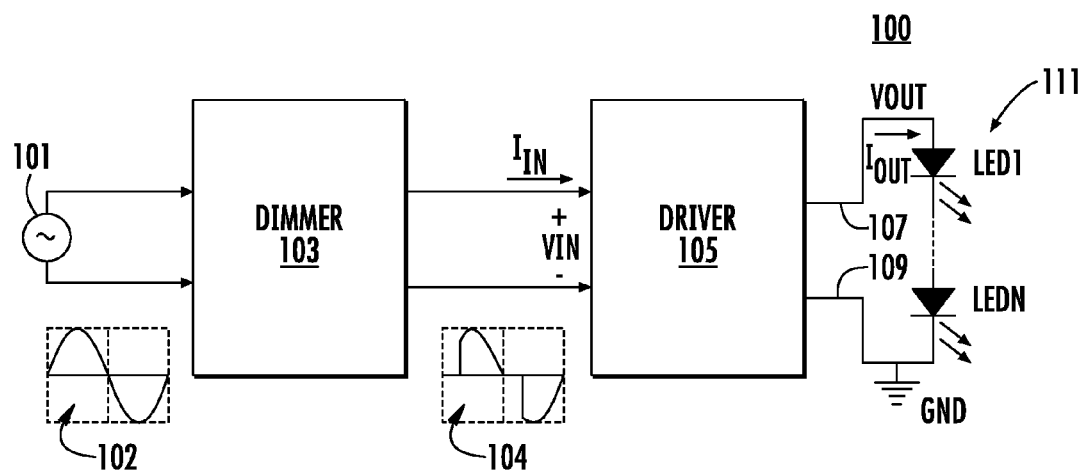
FIG. 1 is a simplified block diagram of a light emitting diode (LED) control system including an LED driver implemented according to one embodiment.

FIG. 1 is a simplified block diagram of a light emitting diode (LED) control system 100 including an LED driver 105 implemented according to one embodiment. The LED control system 100 includes a dimmer 103 and the LED driver 105, in which the input of the dimmer 103 is coupled to an alternating current (AC) source 101 and the output of the LED driver 105 is coupled to one or more LEDs 111 including N individual LEDs, individually labeled LED1, ..., LEDN, in which "N" is a positive integer greater than zero (N is one or more). The LEDs 111 are coupled in series between an output voltage VOUT of the LED driver 105 and a reference voltage node, such as ground (GND). It is noted that the LEDs 111 may include a single LED, or may include multiple LEDs coupled in any one of many different configurations, such as any combination of series and/or parallel couplings as understood by those skilled in the art.

The AC source 101 generally provides a sinusoidal AC line voltage, such as depicted at 102, to the input of the dimmer 103. The AC line voltage has a normal operating range between a minimum root-mean square (RMS) voltage (a.k.a., quadratic mean voltage), and a maximum RMS voltage and has a nominal operating voltage level between the minimum and the maximum RMS voltages. In the United States (US), for example, an AC line voltage provided by a standard outlet may have a nominal RMS voltage of about 120V, a minimum RMS voltage of about 104 volts (V), and a maximum RMS voltage of about 140V. The peak voltage of a sinusoidal voltage is the square-root of two ($\sqrt{2}$) times the RMS voltage, so that the peak voltage of 140 VRMS is almost 200V. Such voltages and ranges are exemplary only in which they may vary by location or jurisdiction. The voltages in Europe, for example, are generally about twice that of the US. The dimmer 103 is generally an AC conductive angle modulated dimmer which converts an AC line voltage to an AC conductive angle modulated voltage. In one embodiment, for example, the dimmer 103 is implemented as a triac dimmer or the like. The dimmer 103 operates to selectively chop one or both of the leading edge and the trailing edge of the AC line voltage at any angle between 0 and 180 degrees for every half cycle (i.e., 180 degrees), to provide an AC conductive angle modulated voltage or "chopped" voltage VIN, such as depicted at 104, having a positive polarity (+) and a negative polarity (−).

In conventional configurations, the AC conductive angle modulated voltage at the output of the dimmer 103 was applied directly to at least one incandescent light bulb (not shown). As understood by those of ordinary skill in the art, assuming that the AC line voltage has the form of a sine wave, the voltage starts at about 0 Volts (V) at zero degrees, reaches a peak positive voltage at 90 degrees, goes back to 0V at the half cycle of 180 degrees, reaches a corresponding peak negative voltage at 270 degrees, then goes back to zero at the end of the cycle at 360 degrees, and repeats for each cycle. The AC conductive angle modulated voltage stays at zero from 0 degrees to the selected chop angle, and then suddenly jumps positive to the value it otherwise would be at for the selected angle, and continues as normal until it reaches zero again at the half cycle. For the second half cycle, the pattern repeats in the negative voltage direction. If the AC line voltage is chopped at its peak, then the voltage of the AC conductive angle modulated voltage jumps to its peak voltage twice each cycle (once positive, and once negative). For example, for a nominal AC voltage of 120 VRMS, the voltage may jump from zero voltages to as high (or low) as almost +200 V (−200V) very quickly twice each cycle. An incandescent light bulb appears as a resistive element and such large voltage changes are inconsequential. Although other AC conductive angle modulated voltage patterns are known, the potential voltage change (dv/dt) may be very large at least once each cycle of the AC line voltage.

The incandescent light bulb is replaced by the LEDs 111, which do not work well with the sudden large voltage excursions of the AC conductive angle modulated voltage from the dimmer 103. Thus, the LED driver 105 is interposed between the dimmer 103 and the LEDs 111. The LED driver 105 performs several functions to convert the output of the dimmer 103 to the desired output for driving the LEDs 111. The LED driver 105 may perform a voltage stepdown (e.g., from 120 VRMS down to 48V as a non-limiting example) depending upon the number and configuration of the LEDs 111. The output current of the LED driver 105, shown as $I_{OUT}$, is adjusted by the LED driver 105 in response to changes of VIN provided at the output of the dimmer 103. As noted above, the dimmer 103 selectively chops leading and/or trailing edges of the AC line voltage with application of the dimming function to generate VIN. Thus, as the dimming or chopping function is increased, the RMS voltage of VIN voltage decreases from an upper RMS voltage with little or no chopping to reduced RMS voltages with increased chopping. In one embodiment, the LED driver 105 changes $I_{OUT}$ proportionately with corresponding changes of the RMS voltage of VIN.

The AC line voltage (e.g., shown at 102) is distorted to provide the AC conductive angle modulated voltage (e.g., shown at 104), resulting in a high voltage change (dv/dt) at least once during each cycle. The input current to the driver 105, shown as $I_{IN}$, has a similar chopped or modulated form as the input voltage resulting in relatively high charge current for each cycle of the AC line voltage. The corresponding high "inrush" charge current can cause an undesirable interaction between the dimmer 103 and a conventional LED driver, such as malfunction of the dimmer 103, undesirable audible noise, as well as undesirable flicker of the LEDs 111. The driver 105, however, is configured to limit the inrush current to a predetermined maximum current level, referred to as $I_{MAX}$. In one embodiment, a current limit resistor coupled in series with the input current path limits inrush current at the beginning of each half cycle of VIN. When the voltage of VIN is applied, at least one capacitor within the driver 105 is charged with a current of $I_{MAX}$ or less until it is almost charged to the same voltage as VIN. As the capacitive voltage within the LED driver 105 increases, the voltage drop across the current limit resistor decreases so that the input current decreases accordingly. A bypass switch coupled in parallel with the current limit resistor is then turned on to effectively remove or bypass the current limit circuit for the remaining portion of the half cycle. The bypass switch is then turned off before the beginning of the second half cycle to again limit inrush current, and operation is repeated for each half cycle of the AC line voltage.

Figure 2:
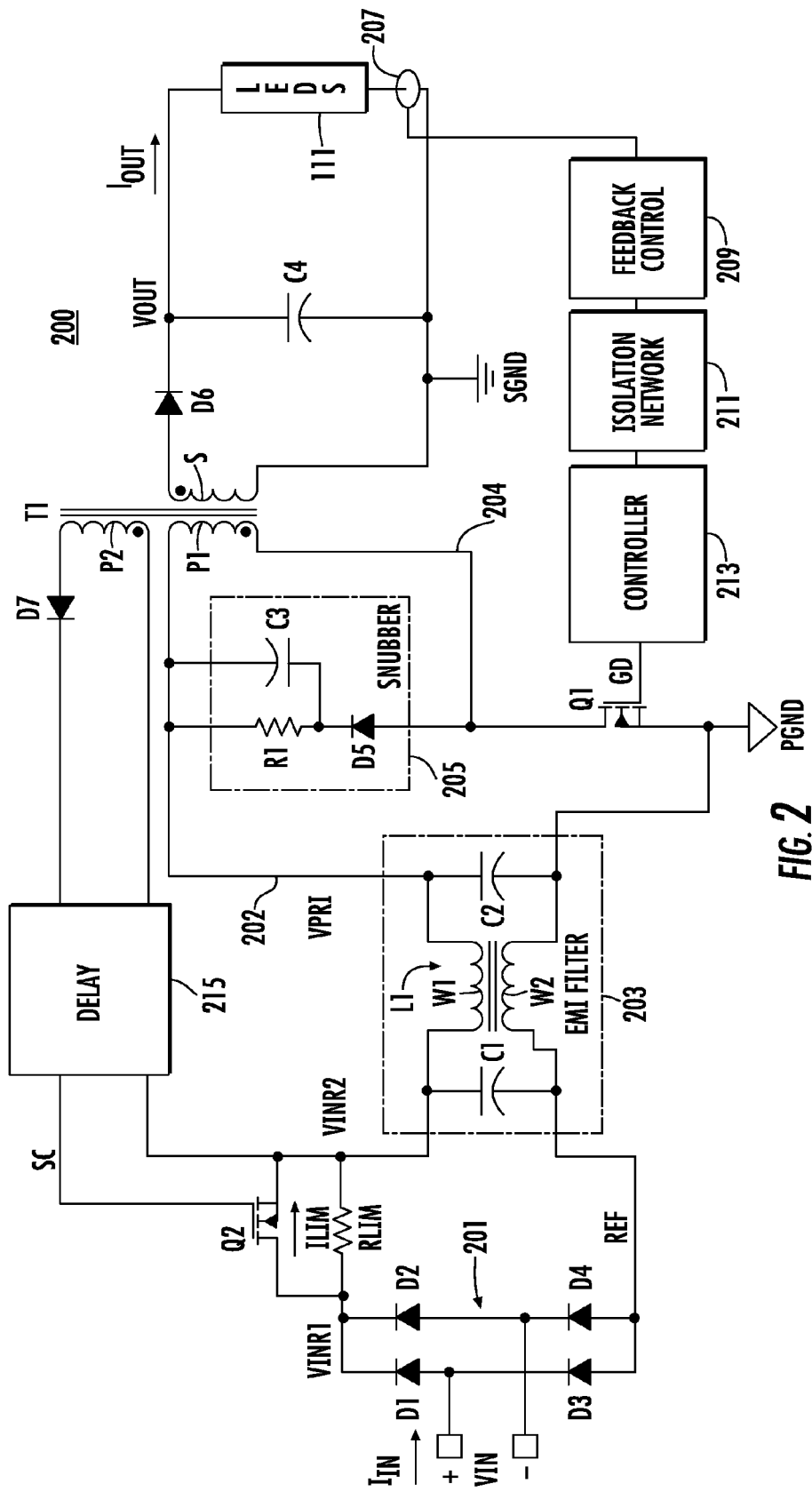
FIG. 2 is a simplified schematic and block diagram of an LED driver implemented according to one embodiment which may be used as the LED driver of FIG. 1 for receiving input voltage and current and providing output voltage and current, in which the LED driver uses another primary winding of the transformer for controlling the bypass switch device.

FIG. 2 is a simplified schematic and block diagram of an LED driver 200 implemented according to one embodiment which may be used as the LED driver 105 for receiving VIN (and $I_{IN}$) and providing VOUT (and $I_{OUT}$). The positive polarity of VIN (VIN+) is provided to a node coupled to the anode of a diode D1 and to the cathode of another diode D3. The negative polarity of VIN (VIN−) is provided to a node coupled to the anode of a diode D2 and to the cathode of another diode D4. The cathodes of diodes D1 and D2 are coupled together at a node developing a rectified input voltage VINR1. The anodes of the diodes D3 and D4 are coupled together at a node developing a reference voltage REF. The diodes D1-D4 collectively operate as a full wave rectifier 201 (e.g., H-bridge) which converts the AC conductive angle modulated voltage VIN+/− to the rectified voltage VINR1 (relative to REF). VINR1 is provided to one end of a current limit resistor RLIM, having its other end developing a voltage VINR2 and coupled to one end of a filter capacitor C1 and to one end of a first winding W1 of a common mode inductor L1. REF is provided to the other end of C1 and to one end of a second winding W2 of the common mode inductor L1. The other end of W1 is coupled to a node 202 which is further coupled to one end of another filter capacitor C2. The other end of W2 is coupled to the other end of C2, which is further coupled to a primary ground PGND. The filter capacitors C1 and C2 and the common mode inductor L1 collectively form an electromagnetic interference (EMI) filter 203.

Node 202 is further coupled to one end of a resistor R1, to one end of a capacitor C3, and to one end of a first primary winding P1 of a transformer T1. As shown, node 202 develops a primary voltage VPRI which is applied to the primary winding P1 of the transformer T1. The other end of P1 is coupled to a node 204, which is coupled to the drain of an electronic switch Q1 and to the anode of a diode D5. The cathode of D5 is coupled to the other ends of R1 and C3. R1, C3 and D5 collectively form an RCD snubber 205 (or snubber network). The source of Q1 is coupled to PGND and its gate receives a gate drive signal GD from a controller 213. The transformer T1 has a secondary winding S having one end coupled to the anode of a diode D6 and another end coupled to a secondary ground SGND. The cathode of the diode D6 is coupled to an output node developing the output voltage VOUT. An output filter capacitor C4 is coupled between VOUT and SGND. The LEDs 111 is also coupled between VOUT and SGND (which is same as GND of FIG. 1). The output current $I_{OUT}$ is shown flowing from the output node through the LEDs 111 to SGND. An output sense network 207 senses at least one output parameter, such as output voltage VOUT and/or the output current $I_{OUT}$, and provides at least one feedback signal to a feedback control network 209. The feedback control module 209 is further coupled through an isolation network 211 to the controller 213. The controller 213 generates the GD signal to control turning on and off the electronic switch Q1.

In this configuration, the transformer T1 includes a second primary winding P2 having one end coupled to the cathode of a diode D7 and its other end coupled to one input of a delay network 215. The cathode of D7 is coupled to another input of the delay network 215, which has a first output providing a switch control signal SC to the gate of an electronic switch Q2. The delay network 215 has a second output coupled to the source of Q2. The drain of Q2 is coupled to the node developing VINR1 and the source of Q2 is coupled to the node developing VINR2, so that the current path of Q2 is coupled in parallel with RLIM. The winding P2 is symbolically shown as the same size as the winding P1, where P2 may be significantly smaller (e.g., having less turns). The switch Q2 is a bypass switch for at least partially bypassing RLIM as further described herein. The primary winding P2, D7 and the delay network 215 collectively form a switch drive or bypass control network for controlling the bypass switch device Q2.

In operation of the LED driver 200, the AC conductive angle modulated voltage VIN is applied to the input of the full wave rectifier 201, which develops the corresponding rectified voltage VINR1 applied to the current limit resistor RLIM. As previously described, VIN is a chopped or modulated version of the sinusoidal AC line voltage in which the initial portion of each half cycle of the AC line voltage is chopped off by the dimmer 103 by a selected angle. The input current $I_{IN}$ has a similar form as the input voltage VIN. VINR1 is a rectified version of VIN in which the negative voltage excursions become positive so that VINR1 has about twice the frequency of VIN. The current through RUM, shown as a limited input current ILIM, has a similar form as the rectified voltage VINR1. ILIM represents the current from VINR1 to VINR2 which is the current through RLIM plus the current through the current path of Q2 (drain to source current). Thus, a relatively high input current change (e.g., large di/dt) would otherwise be applied at the input of the LED driver 200 for each cycle of VINR1. It is desired to limit the current ILIM to the predetermined maximum current level $I_{MAX}$, while at the same time charging VINR2 as quickly as possible in response to VIN. The current limit resistor RLIM has a value chosen to ensure that the current ILIM does not exceed $I_{MAX}$ at any time. For example, if the peak voltage of the AC line voltage is about 200V, and if the LED driver 200 is implemented so that $I_{MAX}$ is about 2.0 Amperes (A), then RLIM may be selected to be at least 100 Ohms ($\Omega$) so that ILIM does not exceed $I_{MAX}$. It is noted that although the initial voltage may be less than the peak value for other selected chop angles, RLIM is selected to ensure proper operation during the worst-case condition.

The switch Q2 is initially turned off at the onset of voltage and current of each cycle of VIN, so that the current limit resistor RLIM is operative to reduce ILIM. The rectified voltage VINR2 is applied to the input of the EMI filter 203 and begins charging the filter capacitors C1 and C2, so that VPRI increases towards the peak value of VIN. It is noted that the EMI filter 203 is a low-pass filter configuration for filtering out higher frequencies associated with converter switching operation, but does not otherwise filter VINR2. The switching frequencies are on the order of 100 Kilo-Hertz (KHz) whereas the AC line voltage is typically less than 100 Hz (e.g., 60 Hz). The rectified voltages VINR1 and VINR2 are twice that of VIN (e.g., ~120 Hz). In one embodiment, the capacitors C1 and C2 have the same capacitance in which the capacitance of each is selected to meet EMI regulations. Thus, the capacitances of the EMI filter capacitors C1 and C2 are relatively low for EMI and switching frequency filtering, and do not operate as bulk capacitors which would otherwise smooth out the rectified input voltage VINR2. Also, the voltage of VPRI is generally about the same as the voltage of VINR2. For example, if RLIM was replaced with a short circuit, then the voltage levels of VINR2 and VPRI would generally both have substantially the same pattern as the rectified voltage VINR1 with little or no ripple filtering by the capacitors C1 and C2.

The resistance of RLIM and the collective capacitance of the EMI filter 203 form a time constant "$\tau$" for limiting the voltage rise of VPRI. Thus, the voltage of VPRI is delayed by more than 3 time constants (>$3\tau$) before reaching the voltage of VIN. $3\tau$ represents about 95% and $4\tau$ represents about 98%, so that if VINR1 was simplified as a step function from zero to its peak value, then VINR2 and VPRI reach a peak level at about $4\tau$. As the voltage of VINR2 increases, the voltage difference across RLIM decreases so that ILIM also decreases. If Q2 is turned fully on, it effectively couples VINR1 and VINR2 together bypassing RLIM. If the voltage difference between VINR1 and VINR2 is large, then turning Q2 fully on with a large voltage disparity would otherwise cause a large ILIM current potentially greater than $I_{MAX}$. In one embodiment, Q2 is turned on more slowly through its linear operating range so that Q2 at least partially bypasses RLIM so that ILIM is controlled to be sufficiently high without exceeding $I_{MAX}$. Alternatively, Q2 may be turned fully on very quickly at a later time once the voltages of VINR1 and VINR2 are substantially equal.

The LED driver 200 includes a switching converter which is configured for flyback converter operation in which the controller 213 controls the switching of Q1 to convert the input voltage to the output voltage VOUT. When Q1 is turned on, current flows through the primary winding P1 to store energy in the transformer T1. When Q1 is turned off, D6 is forward biased and current flows through the secondary winding S to charge the output capacitor C4 and to develop $I_{OUT}$ to the load shown as the LEDs 111. When Q1 is turned back off, the capacitor C4 maintains $I_{OUT}$ to continue providing power to the LEDs 111.

The second primary winding P2 develops a voltage in response to the voltage VPRI across the first primary winding P1, which forward biases D7 and is applied to the delay network 215. The delay network 215 incorporates a turn on delay for activating Q2 so that ILIM remains below $I_{MAX}$. As the delay network 215 begins asserting SC to begin turning on Q2, a current path through Q2 develops to begin bypassing RLIM. Eventually during each cycle of VINR2, Q2 turns fully on to completely bypass RUM and thus to remove the input current limit, so that the voltage of VPRI is about the same as VINR1. As VPRI decreases, the voltage across P2 decreases and the delay network 215 turns Q2 off after its delay period. The switch Q2 is turned completely off by the time VINR1 goes back to zero. In this manner, RLIM is placed back into the circuit for the onset of the next voltage rise of VINR1. In one embodiment, the delay of the delay network 215 is $3\tau$ or more so that Q2 is turned on when the voltage of VINR2 is sufficiently close to the voltage of VINR1.

When the voltage of VPRI reaches its peak value, the voltage across winding P2 reaches its peak voltage level (as shown, winding P2 is a forward winding; voltage levels are similar for a flyback primary winding). In one embodiment, P2 is smaller than P1 so that the peak voltage of P2 is significantly smaller than the voltage of VPRI. In one embodiment, for example, the peak voltage of VPRI is on the order of hundreds of Volts (e.g., up to 200 V or more), whereas the peak voltage across P2 is only about 10V. In one embodiment, the turn-on threshold voltage of Q2 may be between 1-5 V or so depending upon the type of device(s) used to implement Q2. The delay network 215 is configured to delay the buildup of voltage of SC for turning on Q2 in response to the voltage developing across P2. In one embodiment, the delay is based on the delay of VPRI caused by RLIM.

The controller 213 monitors one or more output parameters, such as $I_{OUT}$ and/or VOUT, via the output sense network 207, the feedback control network 209 and the isolation network, and controls the GD signal accordingly for turning on and off the switch Q1. For example, GD may be asserted high to turn Q1 on and low to turn Q1 off. In one embodiment, the controller 213 performs pulse-width modulation (PWM) control in which it controls at least one of pulse width and frequency of GD. In one embodiment, VOUT is maintained at a relatively constant level, or at least at or below a predetermined maximum level, and $I_{OUT}$ is adjusted to follow the RMS voltage level of VINR2. Thus, the chopping or modulation operation of the dimmer 103 adjusts the RMS level of VIN, and the LED driver 105 adjusts $I_{OUT}$ accordingly to adjust the level of dimming of the LEDs 111. The transformer T1 provides electrical isolation between its primary and secondary windings to meet safety parameters. The isolation network 211 maintains isolation between the primary and secondary in which the controller 213 is part of the primary portion of the LED driver 200. The RCD snubber 205 filters out voltage spikes which might otherwise affect operation of the switch Q1. In the illustrated embodiment, the RCD snubber 205 includes the resistor R1, the capacitor C3 and the diode D5, although the snubber network may be implemented in a different manner. The EMI filter 203, shown including the filter capacitors C1 and C2 and the common mode inductor L1, attenuates switching noise generated by the higher frequency switching of Q1 and eliminates or otherwise minimizes switching noise from appearing on the AC line voltage (through the dimmer 103).

The LED driver 200 is shown in simplified form in which other supporting devices, components and/or circuitry is not shown since not necessary for a full and complete understanding of the illustrated embodiments. For example, some of the resistors and capacitors may be implemented with multiple devices coupled in series or parallel or combinations thereof but are shown as a single device. The electronic switch Q1 is shown as an N-channel metal-oxide semiconductor, field-effect transistor (MOSFET), where it is understood that other types of electronic switches may be used to implement the switch Q1, such as other type of MOS devices or FET devices, similar devices with different polarities such as P-channel devices and the like, or different types of transistor devices such as bipolar junction transistors (BJTs) and the like. Thus, Q1 is generally referred to as an electronic switch having a current path coupled between current terminals (e.g., drain-source) and a control terminal (e.g., gate). The switch Q1 is illustrated as a single N-channel MOSFET device, but may be implemented as multiple switch devices, e.g., coupled in parallel to reduce switch resistance, improve efficiency and reduce power consumption, or coupled in series (e.g., cascode devices) to increase breakdown voltage, or Darlington configurations, etc., as understood by those skilled in the art. Q2 is also shown as a single N-channel MOSFET and may also be implemented in any one of the different configurations described for Q1. Q2 may be implemented in a different manner since not used for high frequency switching since it is switched only at about twice the frequency of the AC line voltage. Nonetheless, Q2 may be implemented to minimize voltage drop and maximize current flow for improved efficiency. The controller 213 may be implemented in any suitable manner or by any suitable device, such as, for example, the ISL6745A bridge controller available from Intersil Corporation of Milpitas, Calif. Although not shown, a gate drive system or the like may be provided between the output of the controller 213 and the gate of Q1 for generating the gate drive signal GD.

Figure 3:
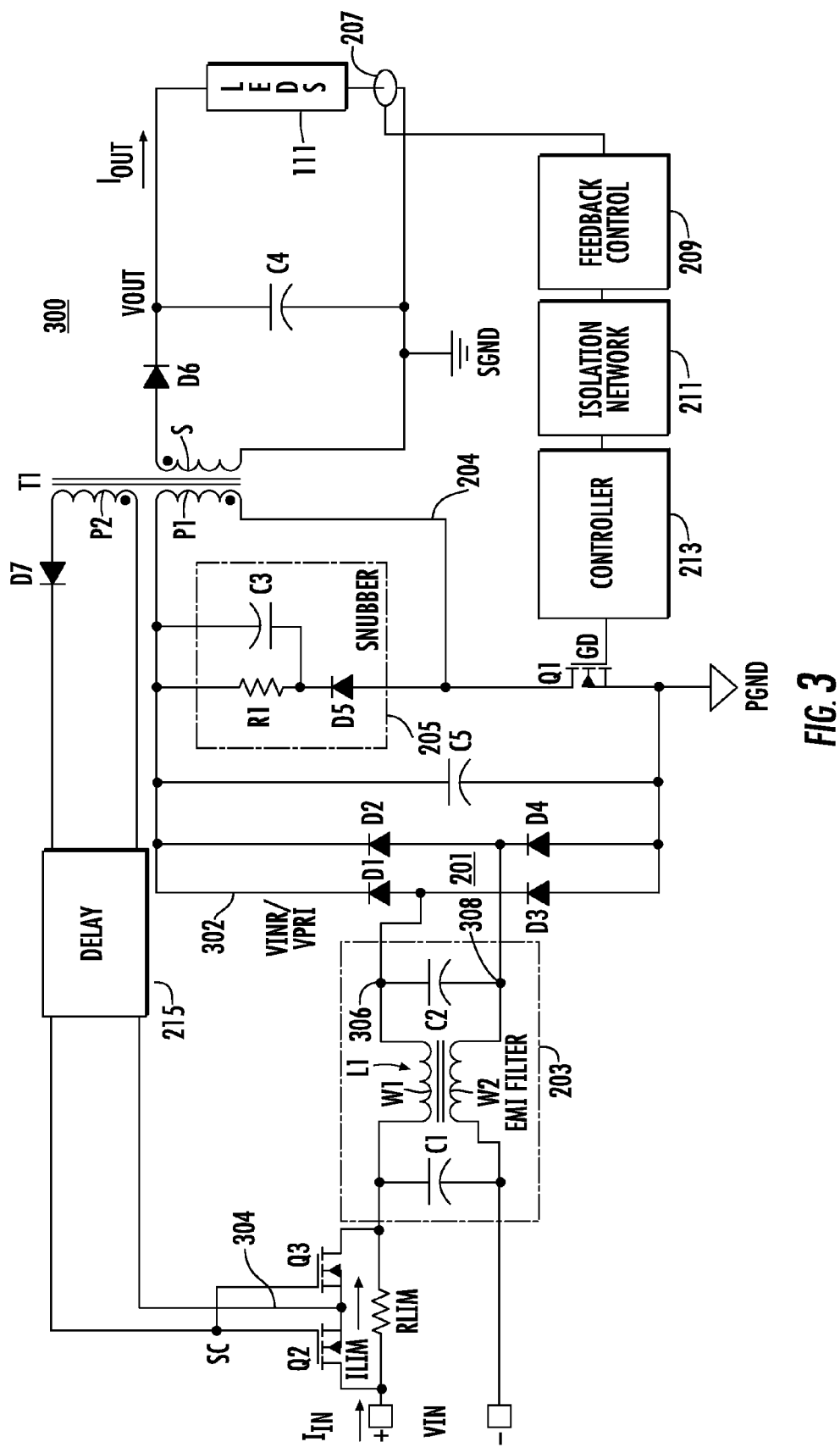
FIG. 3 is a simplified schematic and block diagram of an LED driver implemented according to another embodiment which may also be used as the LED driver of FIG. 1 for receiving input voltage and current and providing output voltage and current.

FIG. 3 is a simplified schematic and block diagram of an LED driver 300 implemented according to another embodiment which may also be used as the LED driver 105 for receiving VIN (and $I_{IN}$) and providing VOUT (and $I_{OUT}$). The LED driver 300 is similar to the LED driver 200 in which similar components assume identical reference numerals. For the LED driver 300, the full wave rectifier 201 is positioned at the other side of the EMI filter 203 for developing a rectified input voltage VINR (or VPRI, shown as VINR/VPRI) on a node 302 coupled to the primary winding P1. VIN+ is provided directly to the drain of Q2 and one end of RLIM. The source of Q2 is coupled to the source of another electronic switch Q3, having its drain coupled to the other end of RLIM and to one differential "input" terminal of the EMI filter 203 as shown at node 304. VIN− is provided directly to the other differential input terminal of the EMI filter 203, having its differential output terminals coupled between a pair of nodes 306 and 308. Node 306 is coupled to the anode of D1 and to the cathode of D3 and node 308 is coupled to the anode of D2 and to the cathode of D4 of the full wave rectifier 201. The anodes of D3 and D4 are coupled together at PGND and the cathodes of D1 and D2 are coupled together at node 302 developing VPRI. Node 302 is coupled to one end of P1 and to the RCD snubber 205 in a similar manner as previously described for node 202 of the LED driver 200. An additional filter capacitor C5 is coupled between node 302 and PGND for filtering VINR. The remaining portions of the LED driver 300 is configured in substantially the same manner as the LED driver 200 previously described.

Operation of the LED driver 300 is somewhat similar as the LED driver 200 except that RLIM limits the input current of the AC input voltage VIN rather than the rectified voltage VINR1 (where $ILIM=I_{IN}$). Since the voltage across and the current through RLIM are both positive and negative for the AC voltage VIN+/−, Q2 might otherwise turn on during the negative half cycle of VIN or at least current might flow through its internal diode. Thus, Q3 is added to form a back-to-back coupling configuration with Q2 to prevent current flow through both Q2 and Q3 when both are turned off by the delay network 215. In an alternative embodiment, a triac replaces Q2 and Q3 for similar function. The EMI filter 203 is provided to filter the AC input voltage rather than the rectified input voltage. The operation of RLIM, the EMI filter 203 and the full wave rectifier 201 are substantially the same as described for the LED driver 200. Q2 and Q3 collectively operate to perform a similar function for AC voltage as the single device Q2 performed for the rectified voltage. Both Q2 and Q3 are turned off together to enable current limit by RLIM, and both are turned on together to collectively bypass RLIM at the appropriate time. In this case, RLIM more directly limits the inrush current $I_{IN}$ at the input for each half cycle of VIN. The time constant τ between the resistance of RLIM, the capacitance of C5 and the capacitances of the EMI filter 203 is essentially the same so that current is limited during the initial rising portion of VPRI. Configuration and operation of the primary winding P2, the diode D7, the delay network 215, Q2 and Q3 are substantially identical as described for the LED driver 200 (in which Q2 and Q3 are operated together). As VPRI rises and with switching operation of Q1, the delay network 215 delays activation of Q2 and Q3 by at least 3τ to ensure that the input current remains sufficiently high without exceeding $I_{MAX}$ as previously described. When VPRI is sufficiently high, Q2 and Q3 are turned fully on to bypass RLIM. As VPRI decreases towards the end of each half cycle, Q2 and Q3 are turned back off so that RLIM limits inrush current for the next half cycle of VPRI. Operation repeats in this manner for each cycle of VIN in a similar manner as described for the LED driver 200.

Figure 4:
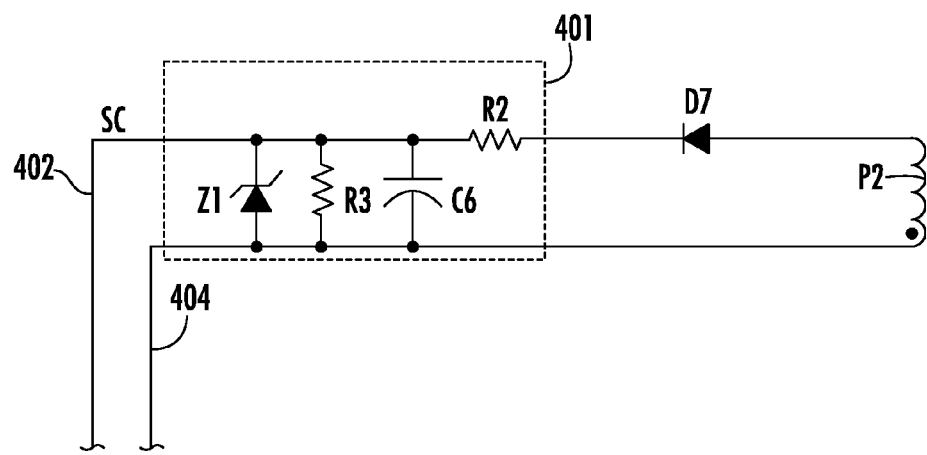
FIG. 4 is a more detailed schematic diagram of a delay network which may be used as the delay network for either of the LED drivers of FIG. 2 or 3.

FIG. 4 is a more detailed schematic diagram of a delay network 401 which may be used as the delay network 215 for either of the LED drivers 200 or 300. As shown, the delay network 401 includes a resistor R2 having one end coupled to the cathode of D7 and another end coupled to a node 402 which develops the SC voltage on node 402 coupled to the gate of Q2 (and to the gate of Q3, if present). The anode of D7 is coupled to one end of P2 as previously described, and the other end of P2 is shown coupled to a node 404 further coupled to the source of Q2 (and to the source of Q3, if present). A capacitor C6, a resistor R3 and a Zener diode Z1 are coupled in parallel between nodes 402 and 404. The Zener diode Z1 is shown having its anode coupled to 404 and its cathode coupled to node 402. The Zener diode Z1 clamps the gate-to-source voltage of Q2 (and Q3, if present) at a suitable threshold voltage level to protect Q2 (and Q3, if present) while allowing Q2 (and Q3, if present) to be fully turned on. As illustrated herein, each delay network may include one or more clamp devices, such as Zener diodes or the like, which are used to clamp voltages to predetermined maximum levels. Thus, the Zener diodes are strategically placed for clamping voltage levels for circuit protection. Although the Zener diodes are not used to design the particular delay function, the effects of the Zener diodes may be considered to adjust delay parameters.

In operation of the delay network 401, voltage developed across P2 forward biases D7 and is divided by the voltage divider formed by R2 and R3 to develop the voltage level of SC on node 402. The capacitor C6 and the gate capacitance of Q2 (or the collective gate capacitance of Q2 and Q3) collectively cooperate with R2 and R3 to delay buildup of voltage of SC for turning on Q2 (and Q3, if present) at the appropriate time. As previously described, Q2 (and Q3) may transition from being fully off into its linear region over time before being turned fully on. Thus, Q2 (and Q3) provides a separate current path to decrease the limit resistance over time and eventually fully bypass RLIM for each cycle of VINR1 or each half cycle of VIN.

Figure 5:
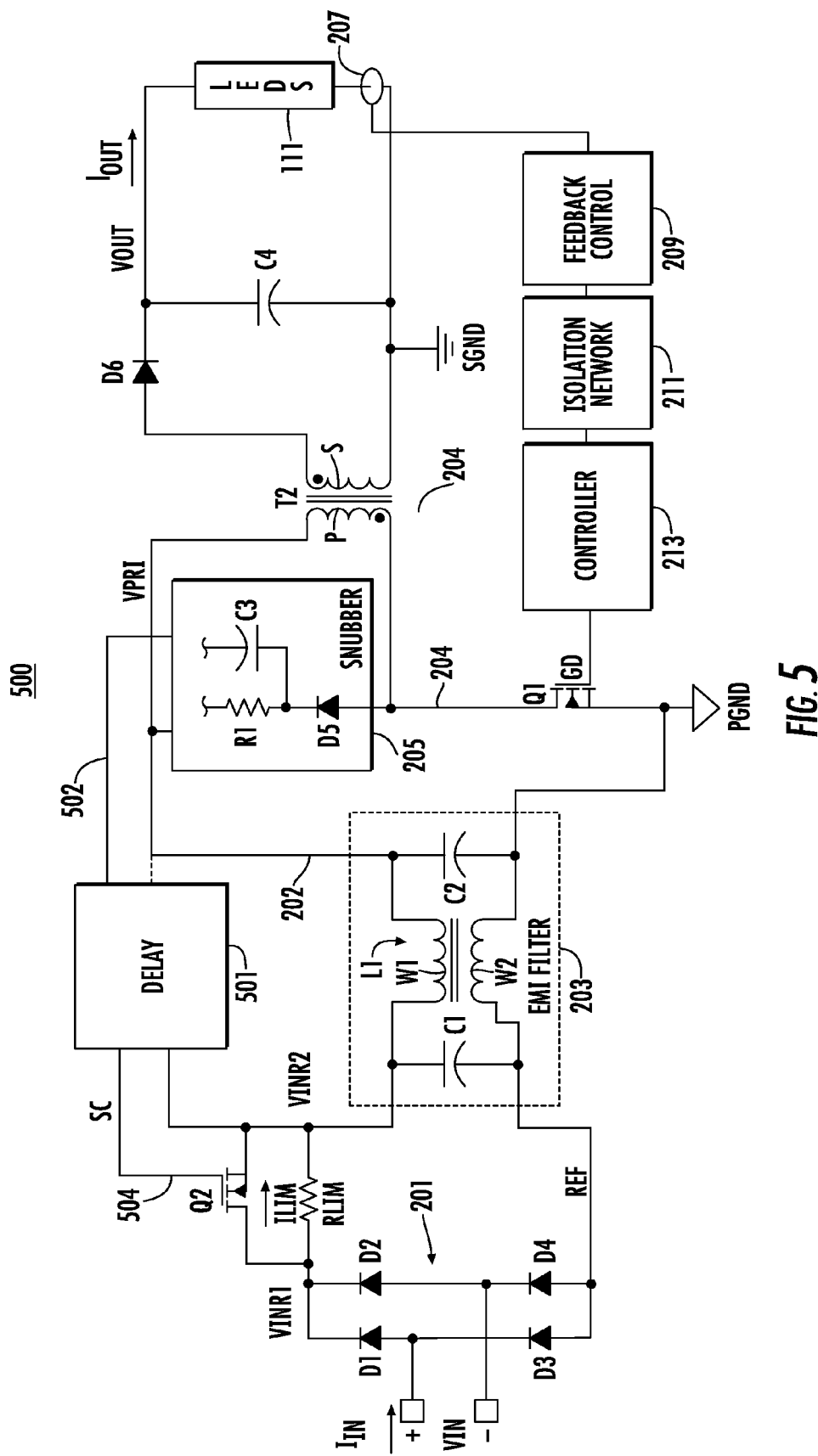
FIG. 5 is a simplified schematic and block diagram of an LED driver implemented according to another embodiment which may also be used as the LED driver of FIG. 1 for receiving input voltage and current and providing output voltage and current, in which the LED driver uses the snubber network for controlling the bypass switch device.

FIG. 5 is a simplified schematic and block diagram of an LED driver 500 implemented according to another embodiment which may also be used as the LED driver 105 for receiving VIN (and $I_{IN}$) and providing VOUT (and $I_{OUT}$). The LED driver 500 is similar to the LED driver 200 in which similar components assume identical reference numerals. The input portion including the full wave rectifier 201, RLIM, Q2 and the EMI filter 203 is substantially the same as that of the LED driver 200. For the LED driver 500, the transformer T1 is replaced by another transformer T2, which operates in a similar manner as T1 but does not include the separate primary winding P2. Instead, T2 includes a single primary winding P which operates in substantially similar manner as the primary winding P1 of T1. The EMI filter 203 has its pair of outputs coupled between node 202 and PGND where node 202 is coupled to one end of the winding P in a similar manner as the LED driver 200. The other end of winding P is coupled to node 204, which is coupled to switch Q1 in the same manner as for the LED driver 200. The output portion coupled to winding S and the feedback loop are both shown substantially the same, in which D6, C4, LEDs 111, output sense network 207, the feedback control 209, the isolation network 211 and the controller 213 are coupled together in substantially the same manner. The controller 213 provides signal GD to control the switch Q1 coupled between node 204 and PGND in substantially the same manner as for the LED driver 200.

For the LED driver 500, the RCD snubber 205 is also included and is shown having substantially the same configuration and is coupled to nodes 202 and 204. The delay network 215 is replaced by a delay network 501, having an input coupled to the RCD snubber 205. Thus, the RCD snubber 205 is used to sense VPRI and to provide drive voltage for Q2 instead of a separate primary winding of the transformer of the switching converter. The particular coupling of the RCD snubber 205 depends on the embodiment as further described below. In one configuration the delay network 501 is further coupled to node 202 (shown as dashed line) depending upon its implementation as further described below. In this manner, the delay network 501 is controlled by the RCD snubber 205 and/or the primary winding P rather than a separate winding of the transformer. The transformer T2 of the LED driver 500 has one less winding as compared to T1 providing a simpler and more power efficient configuration for controlling the delay network 501. The output of the delay network 501 is coupled to Q2 in substantially the same manner, having a first output coupled to the source of Q2 and a second output, shown as node 504, providing SC to the gate of Q2. The input of the delay network 501 is coupled to the RCD snubber 205 rather than a separate winding of the transformer. The RCD snubber 205 develops a significantly greater voltage level as compared to the winding P2 of the LED driver 200, so that the delay network 501 is configured accordingly to provide the appropriate amount of delay. In any of these configurations, the function of the delay network 501 is substantially similar as described for the LED driver 200, in which RLIM initially limits inrush current and then Q2 is turned on to bypass RLIM for each cycle of VINR1.

Figure 6:
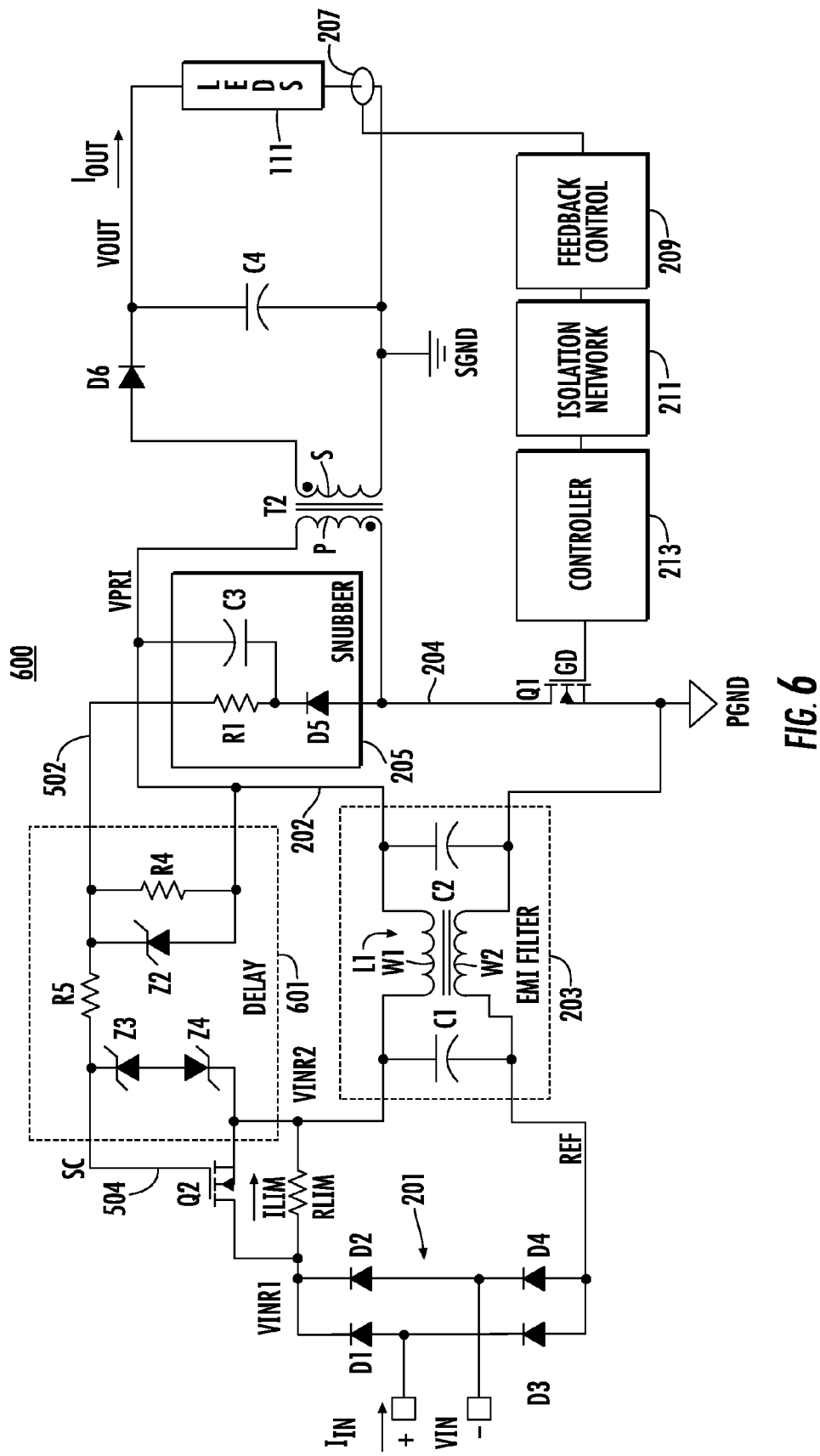
FIG. 6 is a simplified schematic and block diagram of an LED driver implemented according to another embodiment which may also be used as the LED driver of FIG. 1 in accordance with that shown in FIG. 5 using the snubber network.

FIG. 6 is a simplified schematic and block diagram of an LED driver 600 implemented according to another embodiment which may also be used as the LED driver 105 for receiving VIN (and $I_{IN}$) and providing VOUT (and $I_{OUT}$), in which the delay network 501 is implemented as shown as delay network 601. The LED driver 600 is a more specific configuration of the LED driver 500 in which similar components assume identical reference numerals. In this case node 202 is coupled to the delay network 601 and to the other end of capacitor C3 within the RCD snubber 205. The other end of resistor R1 within the RCD snubber 205 is coupled to node 502, which is also coupled to the delay network 601. The delay network 601 includes resistors R4 and R5 and Zener diodes Z2, Z3 and Z4. R4 and Z2 are both coupled in parallel between nodes 202 and 502. Z2 has its anode coupled to node 202 and its cathode coupled to node 502. The delay network 601 further includes a resistor R5 and another pair of Zener diodes Z3 and Z4. R5 is coupled between nodes 502 and 504. Z3 has its cathode coupled to node 504 and its anode coupled to the anode of Z4, which has its cathode coupled to the source of Q2 (at VINR2).

In operation, after the AC line voltage is applied, the snubber capacitor C3 charges relatively quickly during the first switching cycle of Q1 as most of the flyback energy is shunted by C3 until its voltage exceeds the reflected secondary side voltage of the transformer T2. The energy charging C3 is dependent upon the leakage energy of the transformer T2, which charges C3 via the snubber diode D5. Steady state operation occurs when the voltage on C3 is high enough that charge removed through R1 is equal to the charge provided by the leakage energy via D5 in each switching cycle. C3 remains charged and develops a DC voltage during normal operation. The DC voltage on C3 is determined by the discharge path through R1, the delay network 601 and the gate of Q2, which collectively forms an RC time constant. The snubber capacitor C3 charges to a relatively high voltage level as compared to the voltage across winding P2 of the transformer T1. The resistors R1 and R4 provide a voltage divider for dividing down the snubber voltage to a more suitable level for driving the gate of Q2. The values of R1, R4 and R5 are selected to cooperate with the gate capacitance of Q2 to delay turn on of Q2 to ensure that the input current does not exceed $I_{MAX}$ under the worst case condition. As previously described, the worst case condition is when VIN is chopped at the peak value of the AC line voltage (e.g., at about 90 and 270 degrees). Q2 is off so that RLIM ensures that $I_{IN}$ does not exceed $I_{MAX}$ at the onset of the input voltage, and Q2 is turned on after delay to maintain $I_{IN}$ at a suitably high level without exceeding $I_{MAX}$. Z2 clamps the voltage at node 502 to a selected threshold above the voltage of VPRI, and Z3 and Z4 collectively form a clipper circuit which clamps the gate of Q2 in both directions. A typical FET gate is rated at about +/−20V with respect to its source. VIN may have relatively high transient voltages that could generate voltage spikes of either polarity across the source-gate of Q2. The clipper circuit Z3, Z4 clamps the source-gate voltage of Q2 for protection.

Figure 7:
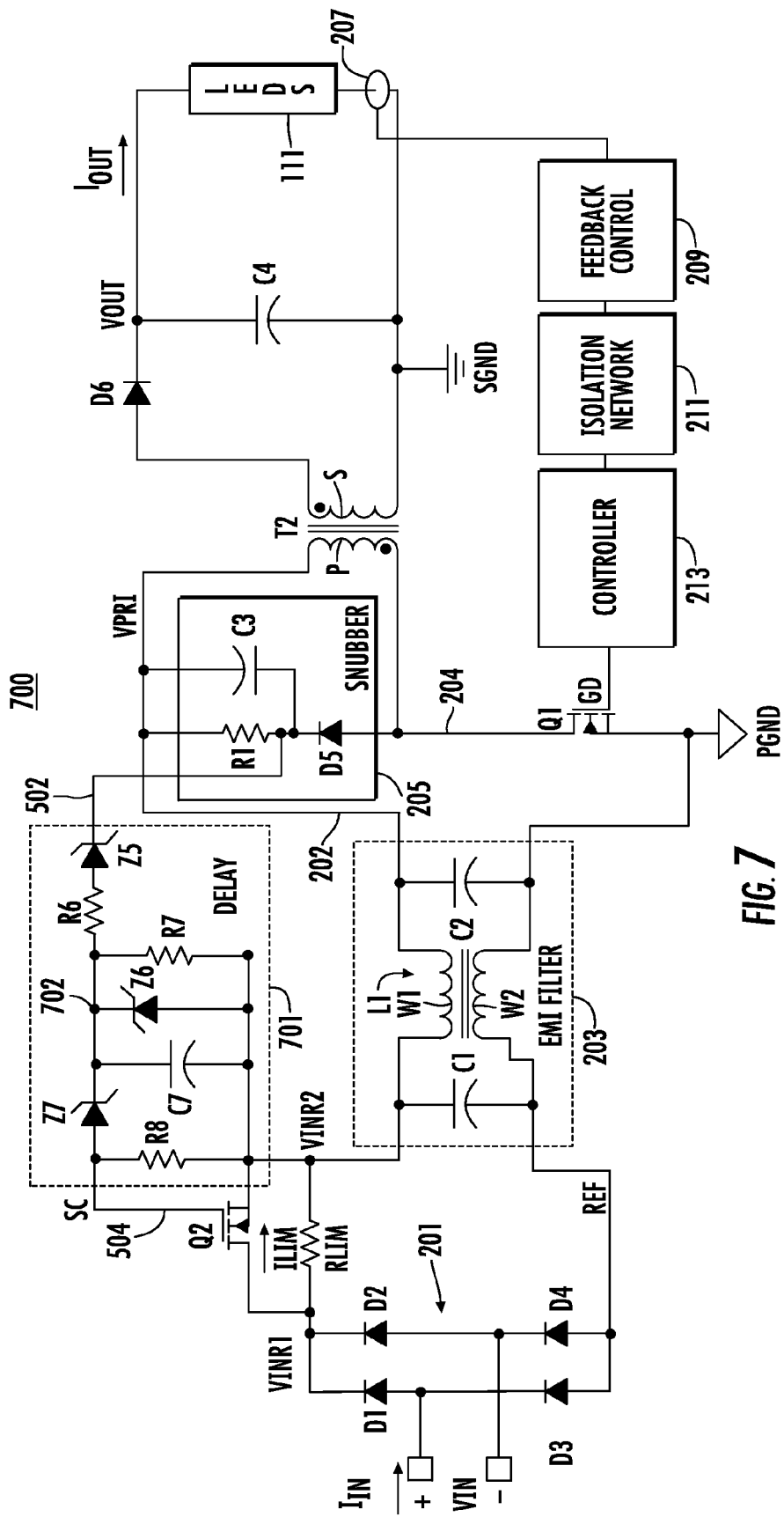
FIG. 7 is a simplified schematic and block diagram of an LED driver implemented according to another embodiment which may also be used as the LED driver of FIG. 1 in accordance with that shown in FIG. 5 using the snubber network.

FIG. 7 is a simplified schematic and block diagram of an LED driver 700 implemented according to another embodiment which may also be used as the LED driver 105 for receiving VIN (and $I_{IN}$) and providing VOUT (and $I_{OUT}$), in which the delay network 501 is implemented as shown as delay network 701. The LED driver 700 is another more specific configuration of the LED driver 500 in which similar components assume identical reference numerals. In this case node 202 is coupled to one end of each of R1 and C3 of the RCD snubber 205. Node 502 is coupled to the common junction of R1, C3 and D5 (e.g., at the cathode of D5). The delay network 701 includes resistors R6, R7 and R8 and Zener diodes Z5, Z6 and Z7. As shown, the cathode of Z5 is coupled to node 502, and its anode is coupled to one end of R6. The other end of R6 is coupled to a node 702, which is coupled to one end of R7, to the cathodes of Z6 and Z7, and to one end of C7. The other ends of R7 and C7 are both coupled to the anode of Z6 and to one end of R8 at the source of Q2. The anode of Z7 is coupled to the other end of R8 and to node 504.

Operation is similar as described for the LED driver 600 in which R6 and R7 form a voltage divider for dividing down the relatively high voltage which develops on C3. C7 combined with the gate capacitance of Q2 forms an RC time constant for delaying the voltage applied to the gate Q2 to maintain the input voltage at a suitable level without exceeding $I_{MAX}$ in a similar manner as previously described.

Figure 8:
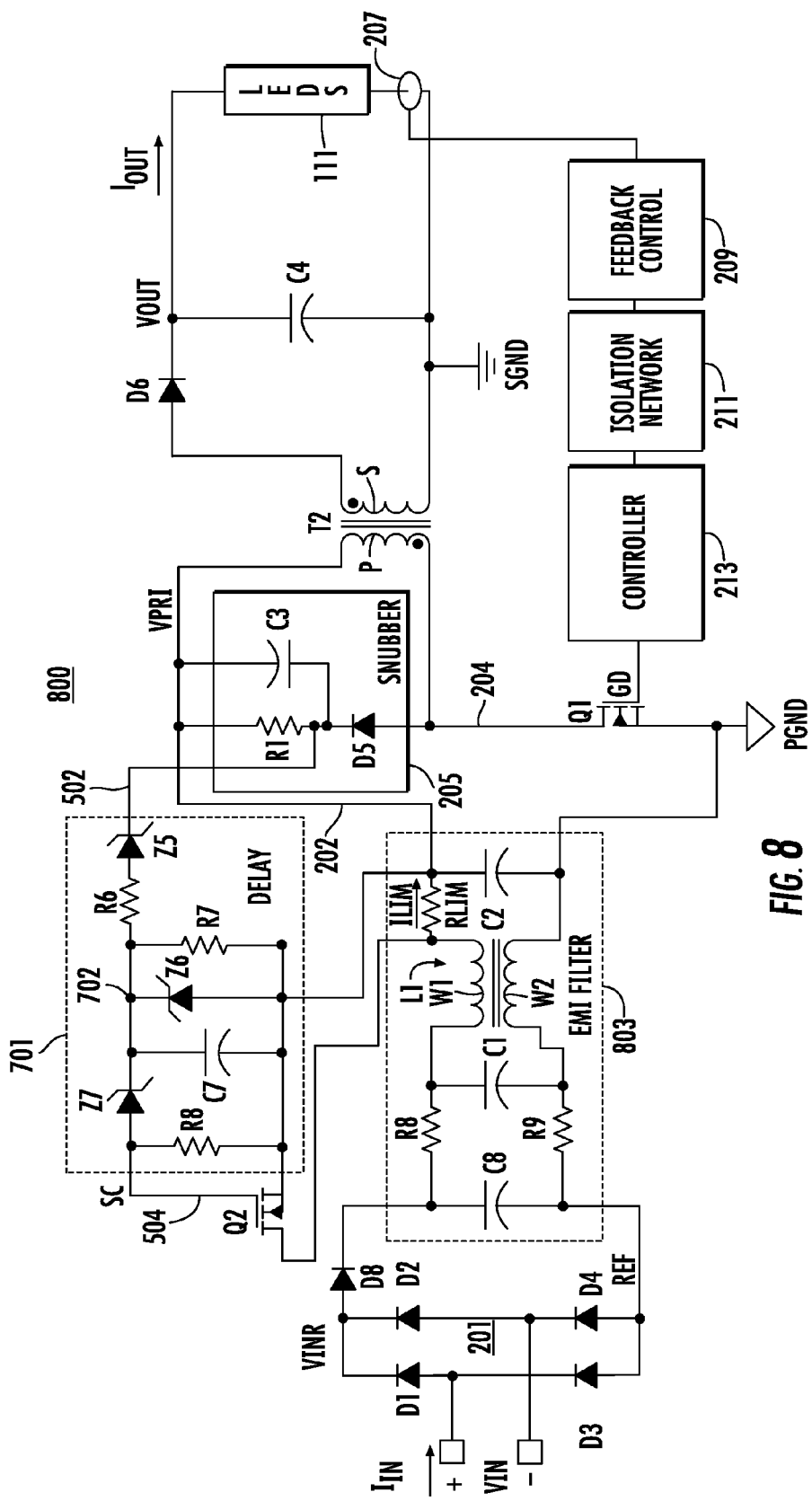
FIG. 8 is a simplified schematic and block diagram of an LED driver implemented according to another embodiment which may also be used as the LED driver of FIG. 1 in accordance with that shown in FIG. 5 using the snubber network and repositioning the current limiting device for improved EMI filtering.

FIG. 8 is a simplified schematic and block diagram of an LED driver 800 implemented according to another embodiment which may also be used as the LED driver 105 for receiving VIN (and $I_{IN}$) and providing VOUT (and $I_{OUT}$). The LED driver 800 is similar to the LED driver 700 in which similar components assume identical reference numerals. In this case, the full wave rectifier 201 develops VINR provided to the anode of an additional diode C8, having its cathode coupled to a first terminal of an EMI filter 803. The EMI filter 803 is a revised version of the EMI filter 203 including additional resistors R8 and R9, an additional capacitor C8, and further incorporates the current limit resistor RLIM. The cathode of D8 is coupled to one end of R8 and to one end of C8. The other end of C8 is coupled to the REF node further coupled to one end of R9. The other end of R8 is coupled to one end of C1 and the other end of R9 is coupled to the other end of C1. C1 is coupled to one end each of the windings W1 and W2 of the common mode inductor L1. RLIM is inserted between the other end of winding W1 and C2. The other end of winding W2 is coupled to the other end of C2 as previously described. The values of C1, C2, W1, and W2 may be adjusted accordingly. The drain and source of Q2 is coupled across RLIM and the value of RLIM may be adjusted. The LED driver 800 includes the delay network 701 which is configured and which operates in substantially the same manner as described for the LED driver 700.

Operation of the LED driver 800 is substantially similar to that of the LED driver 700, except that performance of the EMI filter 803 is improved relative to that of the EMI filter 203. In the snubber configurations of FIGS. 5-7, a small DC current may leak through the delay network 501 (including 601 and 701) from the RCD snubber 205 and be injected into the EMI filter 203, which may affect performance of the EMI filter 203. Also, a portion of the high frequency switching may be reflected through the delay network 501 and RLIM through the input and thus back into the AC line voltage, bypassing the EMI filter 203. For the LED driver 800, the current limit resistor RLIM is moved to the other end of the EMI filter 803, so that any DC current and/or high frequency content does not appreciably affect performance of the EMI filter 803. The size of the capacitor C2 may be increased relative to C1 and relatively small current limit resistors R8 and R9 are added to further limit inrush input current during normal operation. In one embodiment, the diode D8 is a fast recovery diode (as compared to the relatively slow diodes D1 and D2) which further prevents the negative switching frequency and higher order harmonic current from being injected back into the AC lines. Alternatively, diodes D1 and D2 are replaced with faster recovery diodes to eliminate D8.

An LED driver as described herein has an input current path including a full wave rectifier, an input low-pass filter (e.g., EMI filter), and a switching converter for converting an AC conductive angle modulated voltage (e.g., VIN) to a DC output voltage (e.g., VOUT). A current limiting device, such as a resistive device (e.g., RLIM), is placed within the input current path to limit inrush current to a predetermined maximum level (e.g., $I_{MAX}$) in response to the AC conductive angle modulated voltage. As illustrated by FIGS. 2, 3 and 8, the rectifier and low-pass filter may be placed in different positions forming the input current path, and the current limit resistor may be placed at any one of various locations within the input current path (e.g., at the front-end receiving VIN as shown in FIG. 3, after full-wave rectification as shown in FIG. 2, after the low-pass filter as shown in FIG. 8, etc.) to ensure that the input current does not exceed $I_{MAX}$. As the voltage applied to an input of the switching converter (e.g., VPRI) rises in response to VIN applied to the input of the LED driver, the input current across the current limit device decreases so that the current limit device may be bypassed for improved efficiency and performance. In particular, a bypass switch device operates to bypass the current limiting device to maintain the input current at a suitably high level without exceeding a predetermined maximum current level (e.g., as high as possible). In one embodiment, a bypass switch device is placed in parallel with the current limit device and is controlled to at least partially bypass the current limit device in response to rising voltage of the input current path while maintaining the input current at or below $I_{MAX}$.

The bypass switch device may be controlled according to any one of several methods. In a first configuration, a second primary winding is provided on a transformer of the switching converter to sense voltage across the first primary winding and to drive voltage for activating the bypass switch device. A delay circuit is provided to delay activation of the bypass switch device, where the delay is based on the delay caused by the current limiting device (e.g., RC time constant or the like). In a second configuration, a snubber network placed across the primary winding of the transformer is used to drive the voltage used for activating the bypass switch device. The snubber network develops a voltage related to the primary voltage and thus is suitable for indicating current through the input current path of the LED driver.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. An inrush current limiter for use with an LED driver, wherein the LED driver includes an input current path comprising a full wave rectifier, a low pass filter, and a switching converter in which the LED driver converts an AC conductive angle modulated voltage to a DC output voltage, said inrush current limiter comprising:

a current limiting device for coupling in the input current path of the LED driver, wherein said current limiting device limits input current to a predetermined maximum current level in response to the AC conductive angle modulated voltage;

a switch device having a current path coupled in parallel with said current limiting device and having a control terminal; and a switch drive coupled to said control terminal of said switch device and for coupling to the switching converter, wherein said switch drive turns on said switch device to at least partially bypass said current limiting device as a voltage level of an input of the switching converter rises in response to the AC conductive angle modulated voltage.

2. The inrush current limiter of claim 1, wherein the AC conductive angle modulated voltage has a peak voltage level, and wherein said current limiting device comprises a resistor having a resistance which is determined by said peak voltage level and said predetermined maximum current level.

3. The inrush current limiter of claim 1, wherein the low pass filter includes a capacitance, wherein said current limiting device comprises a resistance which forms a time constant with said capacitance of said filter, and wherein said switch drive includes a delay based on said time constant.

4. The inrush current limiter of claim 1, wherein the switching converter comprises a transformer having a first primary winding coupled to the input current path, and wherein said switch drive comprises:

a second primary winding provided on the transformer; and a delay network coupled to said second primary winding and to said control terminal of said switch device.

5. The inrush current limiter of claim 4, wherein said current limit device delays voltage increase across the first primary winding of the transformer based on a time constant, and wherein said delay network delays activation of said switch device by a time period based on said time constant.

6. The inrush current limiter of claim 4, wherein said delay network comprises a resistor-capacitor circuit.

7. The inrush current limiter of claim 1, wherein the switching converter comprises a transformer with a primary winding, and wherein said switch drive comprises:

a snubber network for coupling across the primary winding of the transformer; and a delay network having an input coupled to said snubber network and having an output coupled to said control terminal of said switch device.

8. The inrush current limiter of claim 7, wherein said snubber network comprises a resistor-capacitor circuit, and wherein said delay network comprises a resistive voltage divider.

9. The inrush current limiter of claim 7, wherein the snubber network comprises a resistor-capacitor and rectifier circuit, and wherein said delay network comprises a resistor-capacitor circuit.

10. A light emitting diode driver, comprising:

an input network which converts an AC conductive angle modulated voltage to a rectified voltage, said input network including an input current path;

a switching converter, comprising:

a transformer having a first primary winding coupled to said input network and having a secondary winding;

a switching device coupled to said first primary winding of said transformer for switching current through said first primary winding; and an output network coupled to said secondary winding for developing a DC output voltage;

a current limiting device coupled in said input current path of said input network for limiting input current to a predetermined maximum current level in response to said AC conductive angle modulated voltage;

a bypass device having a current path coupled in parallel with said current limiting device, and having a control terminal; and a bypass control network having an input coupled to said switching converter and an output coupled to said control terminal of said bypass device, wherein said bypass control network turns on said bypass device to at least partially bypass said current limiting device as a voltage level of said primary winding of said transformer increases in response to the AC conductive angle modulated voltage.

11. The light emitting diode driver of claim 10, wherein said bypass control network comprises:

a second primary winding provided on said transformer; and a delay network having an input coupled to said second primary winding and having an output coupled to said control terminal of said bypass device.

12. The light emitting diode driver of claim 11, wherein said current limiting device delays voltage increase of said first primary winding based on a time constant, and wherein said delay network delays activation of said bypass device by a time period based on said time constant.

13. The light emitting diode driver of claim 10, wherein:

said bypass device comprises a transistor having a control terminal, having a first current terminal and having a second current terminal;

wherein said bypass control network comprises:

a second primary winding provided on said transformer having a first end coupled to said first current terminal of said transistor and having a second end;

a diode having an anode coupled to said second end of said second primary winding and having a cathode;

a first resistor having a first end coupled to said cathode of said diode and having a second end coupled to said control terminal of said transistor;

a second resistor coupled between said control terminal of said transistor and said second current terminal of said transistor; and a capacitor coupled between said control terminal of said transistor and said second current terminal of said transistor.

14. The light emitting diode driver of claim 10, wherein:

said input network comprises an electromagnetic interference filter including a capacitance;

wherein said current limiting device comprises a resistance which forms a time constant with said capacitance of said electromagnetic interference filter to delay voltage increase across said first primary winding of said transformer; and wherein said bypass control network comprises a delay network which activates said bypass device after a delay based on said time constant.

15. The light emitting diode driver of claim 10, wherein said bypass control network comprises:

a snubber network coupled across said first primary winding of said transformer; and a delay network having an input coupled to said snubber network and an output coupled to said control terminal of said bypass device.

16. The light emitting diode driver of claim 15, wherein:
said snubber network comprises:
  a diode having an anode coupled to a first end of said first primary winding of said transformer and having a cathode;
  a capacitor having a first end coupled to said cathode of said diode and having a second end coupled to a second end of said first primary winding of said transformer; and
  a first resistor having a first end coupled to said cathode of said diode and having a second end; and
wherein said delay network comprises:
  a second resistor having a first end coupled to said second end of said first resistor and having a second end coupled to said second end of said first primary winding of said transformer; and
  a third resistor having a first end coupled to said first end of said second resistor and having a second end coupled to said control terminal of said bypass device.

17. The light emitting diode driver of claim 15, wherein:
said snubber network comprises:
  a diode having an anode coupled to a first end of said first primary winding of said transformer and having a cathode;
  a first capacitor having a first end coupled to said cathode of said diode and having a second end coupled to a second end of said first primary winding of said transformer; and
  a first resistor having one end coupled to said cathode of said diode and having a second end coupled to said second end of said first primary winding of said transformer; and
wherein said delay network comprises:
  a second resistor having a first end coupled to said first end of said first capacitor and having a second end coupled to said control terminal of said bypass device;
  a third resistor having a first end coupled to said second end of said second resistor and having a second end coupled to a current terminal of said bypass device;
  a second capacitor having a first end coupled to said second end of said second resistor and having a second end coupled to said current terminal of said bypass device; and
  a fourth resistor having a first end coupled to said control terminal of said bypass device and having a second end coupled to said current terminal of said bypass device.

18. The light emitting diode driver of claim 10, wherein:
said input network comprises:
  a full wave rectifier having an input receiving said AC conductive angle modulated voltage and an output providing a rectified voltage on a rectified node relative to a reference node;
  an electromagnetic interference filter, comprising:
    a first capacitor coupled between said rectified node and said reference node;
    a first resistor having a first end coupled to said rectified node and having a second end;
    a second resistor having a first end coupled to said reference node and having a second end;
    a second capacitor coupled between said second end of said first resistor and said second end of said second resistor;
    a common mode inductor having a first winding with a first end coupled to said second end of said first resistor and a second end, and having a second winding with a first end coupled to said second end of said second resistor and a second end coupled to ground; and
    a third capacitor having a first end coupled to ground and having a second end coupled to a first end of said primary winding of said transformer; and
  wherein said bypass device comprises a resistor coupled between said second end of said first winding of said common mode inductor and said second end of said third capacitor.

19. A light emitting diode control system, comprising:
a dimmer having an input receiving an AC line voltage and an output providing an AC conductive angle modulated voltage; and
a light emitting diode driver, comprising:
  an input network which converts said AC conductive angle modulated voltage to a rectified voltage, said input network including an input current path;
  a switching converter, comprising:
    a transformer having a primary winding coupled to said input network and having a secondary winding;
    a switching device coupled to said first primary winding of said transformer for switching current through said first primary winding; and
    an output network coupled to said secondary winding for developing a DC output voltage;
  a current limiting device coupled in said input current path of said input network for limiting input current to a predetermined maximum current level in response to said AC conductive angle modulated voltage;
  a bypass device having a current path coupled in parallel with said current limiting device, and having a control terminal; and
  a bypass control network having an input coupled to said switching converter and an output coupled to said control terminal of said bypass device, wherein said bypass control network turns on said bypass device to at least partially bypass said current limiting device as a voltage level of said primary winding of said transformer increases in response to said AC conductive angle modulated voltage.

20. The light emitting diode control system of claim 19, wherein said input current path and said current limiting device delays voltage increase across said primary winding of said transformer in response to said AC conductive angle modulated voltage by a time period, and wherein said bypass control network delays activation of said bypass device based on said time period to limit input current to said predetermined maximum current level.

21. A method for limiting inrush current of an LED driver, wherein the LED driver includes an input current path comprising a full wave rectifier, a low pass filter, and a switching converter in which the LED driver converts an AC conductive angle modulated voltage to a DC output voltage, said method comprising:
  limiting the inrush current to a predetermined maximum current level using a current limiting device placed in the input current path of the LED driver; and
  bypassing the current limiting device for each half cycle of the AC conductive angle modulated voltage so that input current does not exceed the predetermined maximum current level.

* * * * *